US009460555B2

United States Patent
Mayhew et al.

(10) Patent No.: US 9,460,555 B2
(45) Date of Patent: Oct. 4, 2016

(54) SYSTEM AND METHOD FOR THREE-DIMENSIONAL VISUALIZATION OF GEOGRAPHICAL DATA

(71) Applicant: VISION III IMAGING, INC., Reston, VA (US)

(72) Inventors: Christopher Alan Mayhew, Oakton, VA (US); Craig M. Mayhew, Herndon, VA (US)

(73) Assignee: VISION III IMAGING, INC., Vienna, VA (US)

( * ) Notice: Subject to any disclaimer, the term of this patent is extended or adjusted under 35 U.S.C. 154(b) by 0 days.

(21) Appl. No.: 14/635,398

(22) Filed: Mar. 2, 2015

(65) Prior Publication Data

US 2015/0187132 A1    Jul. 2, 2015

Related U.S. Application Data

(63) Continuation of application No. 13/145,719, filed as application No. PCT/US2010/021627 on Jan. 21, 2010, now Pat. No. 9,001,115.

(60) Provisional application No. 61/146,186, filed on Jan. 21, 2009.

(51) Int. Cl.
  *G06T 17/05* (2011.01)
  *H04N 13/04* (2006.01)
  (Continued)

(52) U.S. Cl.
  CPC ........... *G06T 17/05* (2013.01); *G06F 3/04815* (2013.01); *H04N 13/02* (2013.01); *H04N 13/0275* (2013.01); *H04N 13/04* (2013.01); *H04N 13/0402* (2013.01)

(58) Field of Classification Search
  USPC .......................................................... 345/419
  See application file for complete search history.

(56) References Cited

U.S. PATENT DOCUMENTS 4,815,819 A    3/1989  Mayhew et al.
4,966,436 A   10/1990  Mayhew et al.
(Continued)

FOREIGN PATENT DOCUMENTS

EP    1235438 A1    8/2002

OTHER PUBLICATIONS

International Search Report from the European Patent Office for International Application No. PCT/US2010/021627, mailed Jun. 4, 2010.

(Continued)

*Primary Examiner* — Christopher S Kelley
*Assistant Examiner* — Kaitlin A Retallick
(74) *Attorney, Agent, or Firm* — The Marbury Law Group, PLLC

(57) ABSTRACT

A method of using a computer to generate virtual autostereoscopic images from a three-dimensional digital data set is provided. The method includes establishing a first point of view and field of view of a subject volume including a region of interest. The method also includes reading at least one scene parameter associated with the field of view of the subject volume. The method also includes determining a second point of view offset some distance and along some vector from the first point of view based on a value derived from at least one scene parameter. The method also includes generating and storing images and relevant metadata from said first and second points of view. The method also includes displaying the stored images by alternatingly displaying stored images from said first and second points of view. The method further includes performing one or more transformations on the alternatingly displayed images.

19 Claims, 4 Drawing Sheets

(51) Int. Cl.
*H04N 13/02* (2006.01)
*G06F 3/0481* (2013.01)

(56) References Cited

U.S. PATENT DOCUMENTS

| | | |
|---|---|---|
| 5,014,126 A | 5/1991 | Pritchard et al. |
| 5,157,484 A | 10/1992 | Pritchard et al. |
| 5,325,193 A | 6/1994 | Pritchard et al. |
| 5,444,479 A | 8/1995 | Fernekes et al. |
| 5,510,831 A | 4/1996 | Mayhew |
| 5,678,089 A | 10/1997 | Bacs, Jr. et al. |
| 5,699,112 A | 12/1997 | Bacs, Jr. |
| 5,933,664 A | 8/1999 | Bacs, Jr. |
| 5,991,551 A | 11/1999 | Bacs, Jr. et al. |
| 6,324,347 B1* | 11/2001 | Bacs, Jr. .............. G02B 27/646 345/421 |
| 6,734,900 B2 | 5/2004 | Mayhew |
| 7,162,083 B2 | 1/2007 | Mayhew et al. |
| 7,340,094 B2 | 3/2008 | Mayhew et al. |
| 7,463,257 B2 | 12/2008 | Martin |
| 7,832,949 B2 | 11/2010 | Mayhew et al. |
| 8,081,206 B2 | 12/2011 | Martin et al. |
| 2004/0061726 A1 | 4/2004 | Dunn et al. |
| 2006/0203335 A1* | 9/2006 | Martin .............. G02B 27/2214 359/462 |
| 2006/0203355 A1 | 9/2006 | Martin et al. |
| 2007/0098258 A1* | 5/2007 | Mayhew .............. G06T 7/0071 382/164 |
| 2007/0270687 A1* | 11/2007 | Gardi .................. A61B 8/0833 600/425 |

OTHER PUBLICATIONS

Mayhew, et al., "Three-Dimensional Visualization of Geographical Terrain Data Using Temporal Parallax Difference Induction", Proceedings of SPIE—The International Society for Optical Engineering—Proceedings of SPIE-IS and T Electronic Imaging—Human Vision and Electronic Imaging XIV 2009, SPIE USA LNKD-DOI: 10.1117/12.807201, vol. 7240, pp. 72401H-1 to 72401H-11, XP-002576988, (2009).

* cited by examiner

SYSTEM AND METHOD FOR THREE-DIMENSIONAL VISUALIZATION OF GEOGRAPHICAL DATA

CROSS REFERENCE TO RELATED APPLICATIONS

This application is a continuation of U.S. patent application Ser. No. 13/145,719, which entered national stage on Jul. 21, 2011, based on International Application No. PCT/US2010/021627, filed on Jan. 21, 2010, which claims the benefit of priority from U.S. Provisional Application No. 61/146,186, filed on Jan. 21, 2009. The disclosures of all the foregoing applications are herein incorporated by reference in their entireties.

TECHNICAL FIELD

The presently disclosed embodiments relate to the visualization of geographical data and, more particularly, to a system and method for using parallax information to generate and display autostereoscopic 3D images on standard unaided screens.

BACKGROUND

Ever since early humans drew images of their world on cave walls, mankind has endeavored to create images of the environment in which we live. The 6th century Greeks are generally credited with extending simple pictures to geographic data visualization with the production of the first known maps. The recent advent of geographical Internet browsers has carried this concept to an elegant digital extreme. Every corner of the earth is now detailed and viewable at any time through personal computers or mobile devices. Remote terrain inspections, which were the exclusive subject of national security assets only a few years ago, are now commonplace.

Despite the ability to present and view geographical terrain data from Arkhangelsk to Tierra Del Fuego and all other points around the globe, the vast majority of this data is viewed two-dimensionally. While stereoscopic imaging techniques have played an important role in the history of modern map making, the necessity of special viewing apparatus has made their adoption in the everyday use of geographical browsers rare. Even where geographical browser providers have included three-dimensional terrain data in the landscape model, the views are still presented to the user two-dimensionally. Every now and then an occasional enthusiast will go to the trouble of generating stereo pairs from three-dimensional terrain data and present them as anaglyph images to be viewed using red and blue glasses. Such instances are the exception and not the rule when it comes to viewing geographical data.

The production of two-dimensional images that can be displayed to provide a three-dimensional illusion has been a long-standing goal in the visual arts field. Methods and apparatus for producing such three-dimensional illusions have to some extent paralleled the increased understanding of the physiology of human depth perception as well as developments in image manipulation through analog/digital signal processing and computer imaging software.

Binocular (i.e., stereo) vision requires two eyes that look in the same direction, with overlapping visual fields. Each eye views a scene from a slightly different angle and focuses it onto the retina, a concave surface at the back of the eye lined with nerve cells, or neurons. The two-dimensional retinal images from each eye are transmitted along the optic nerves to the brain's visual cortex, where they are combined in a process known as stereopsis, to form a three-dimensional perception of the scene being viewed.

Perception of three-dimensional space depends on various kinds of information in the scene being viewed including monocular cues and binocular cues, for example. Monocular cues include elements such as relative size, linear perspective, interposition, highlights, and shadows. Binocular cues include retinal disparity, accommodation, convergence, and learned cues including a familiarity with the subject matter. While all these factors may contribute to creating a perception of three-dimensional space in a scene, retinal disparity may provide one of the most important sources of information for creating a three-dimensional perception. Particularly, retinal disparity results in parallax information (i.e., an apparent change in the position, direction of motion, or other visual characteristics of an object caused by different observational positions) being supplied to the brain. Because each eye has a different observational position, each eye can provide a slightly different view of the same scene. The differences between the views represent parallax information that the brain can use to perceive three dimensional aspects of a scene.

A distinction exists between monocular depth cues and parallax information in the visual information received. Both eyes provide essentially the same monocular depth cues, but each eye provides different parallax depth information, a difference that is essential for producing a true three-dimensional view. Depth information may be perceived, to a certain extent, in a two-dimensional image. For example, monocular depth may be perceived when viewing a still photograph, a painting, standard television and movies, or when looking at a scene with one eye closed. Monocular depth is perceived without the benefit of binocular parallax depth information. Such depth relations are interpreted by the brain from monocular depth cues such as relative size, overlapping, perspective, and shading. To interpret monocular depth information from a two-dimensional image (i.e., using monocular cues to indicate a three-dimensional space on a two-dimensional plane), the viewer is actually reading depth information into the image through a process learned in childhood.

It is known that the act of visual perception is a cognitive exercise and not merely a stimulus response. In other words, perception is a learned ability which we develop in infancy. Binocular vision is the preferred method for capturing parallax information by humans and certain animals. However, other living organisms without the luxury of significant overlapping fields of view have developed other mechanisms to determine spatial relationships.

Certain insects and animals determine relative spatial depth of a scene by simply moving one eye from side to side. A pigeon bobbing its head back and forth as it walks is a good example of this action. The oscillating eye movement presents motion parallax depth information over time. This allows for the determination of depth order by the relative movement of objects in the scene. Humans also possess the ability to process visual parallax information presented over time.

Several mechanical/electronic systems and methods exist for creating and/or displaying true three dimensional images. These methods may be divided into two main categories: stereoscopic display methods and autostereoscopic display methods. Stereoscopic techniques including stereoscopes, polarization, anaglyphic, Pulfrich, and shuttering technologies requiring the viewer to wear a special viewing apparatus such as glasses, for example. Autostereoscopic techniques such as holography, lenticular screens, and parallax barriers produce images with a three-dimensional illusion without the use of special glasses, but these methods generally require the use of a special screen.

Certain other systems and methods use square-wave switching and parallax scanning information to create autostereoscopic displays that allow a viewer to perceive an image as three-dimensional even when viewed on a conventional display. For example, at least one method has been demonstrated in which a single camera records images while undergoing parallax scanning motion. Thus, the optical axis of a single camera may be made to move in a repetitive pattern that causes the camera optical axis to be offset from a nominal stationary axis. This offset produces parallax information. The motion of the camera optical axis is referred to as parallax scanning motion. As the motion repeats over the pattern, the motion becomes oscillatory. At any particular instant, the motion may be described in terms of a parallax scan angle.

Over the years the present inventors and their associates have developed a body of work based on methods (optical and synthetic) and apparatus that capture and display parallax information over time. U.S. Pat. Nos. 5,014,126, 4,815,819, 4,966,436, 5,157,484, 5,325,193, 5,444,479, 5,699,112, 5,933,664, 5,510,831, 5,678,089, 5,991,551, 6,324,347, 6,734,900, 7,162,083, 7,340,094, and 7,463,257 relate to this body of work and are hereby incorporated by reference. In addition, U.S. patent application Ser. Nos. 10/536,005 and 11/547,714 also relate to this body of work and are hereby also incorporated by reference.

To generate an autostereoscopic display based on parallax information, images captured during the scanning motion may be sequentially displayed. These images may be displayed at a view cycle rate of, for example, about 3 Hz to about 6 Hz. This frequency represents the rate at which the parallax information in the sequence is changed. The displayed sequences of parallax images may provide an autostereoscopic display that conveys three-dimensional information to a viewer.

Parallax information may also be incorporated into computer generated images as described in the aforementioned U.S. Pat. No. 6,324,347 ("the '347 patent"). The '347 patent discloses, inter alia, a method for computer generating parallax images using a virtual camera having a virtual lens. The parallax images may be generated by simulating a desired parallax scanning pattern of the lens aperture, and a ray tracing algorithm, for example, may be used to produce the images. The images may be stored in computer memory on a frame-by-frame basis. The images may be retrieved from memory for display on a computer monitor, recorded on video tape for display on a TV screen, and/or recorded on film for projection on a screen.

Thus, in the method of the '347 patent, the point of view of a camera (e.g., the lens aperture) is moved to produce the parallax scanning information. The ray tracing method of image generation, as may be used by one embodiment of the method of the '347 patent, may be used to generate high quality computer images, such as those used in animated movies or special effects. Using this ray-tracing method to simulate optical effects such as depth of field variations, however, may require large amounts of computation and can place a heavy burden on processing resources. Therefore, such a ray tracing method may be impractical for certain applications, such as 3D computer games, animation, and other graphics applications, which require quick response.

Another previously mentioned U.S. Pat. No. 7,463,257 ("the '257 patent") discloses, inter alia, a method for parallax scanning through scene object position manipulation. Unlike the moving point of view methods taught in the '347 patent, the '257 patent teaches a fixed point of view, and scene objects are moved individually in a coordinated pattern to simulate a parallax scan. Even though the final images created using the '347 patent and the '257 patent may appear similar, the methods of generating these images are very different.

U.S. patent application Ser. No. 10/536,005 teaches, inter alia, methods for critically aligning images with parallax differences for autostereoscopic display. The process requires two or more images of a subject volume with parallax differences and whose visual fields overlap in some portions of each of the images. A first image with an area of interest is critically aligned to a second image with the same area of interest but with a parallax difference. The images are aligned by means of a software viewer whereby the areas of interest are critically aligned along their translational and rotational axes to converge at some point. This is accomplished by alternating views of each image at between 2 to 60 Hz and adjusting the axial alignment of each image relative to one another until a critical alignment convergence is achieved on a sub-pixel level at a point in the area of interest. Autostereoscopic viewing is achieved by alternately displaying (a.k.a. square-wave switching) a repetitive pattern of critically aligned parallax images between 3 and 6 Hz.

Much of the parallax scanning, square-wave switching and other parallax visualization prior art deals with capturing, simulating and/or presenting three-dimensional scenes in which objects and the environment are reasonably close to the image point of origin (camera sensor). Parallax visualization of geographical data for autostereoscopic three-dimensional image display on conventional screens, however, presents a different set of circumstances. In general, the square-wave and parallax scanning prior art requires the determination of a point of convergence at the time of image capture or computer generation. Thus, these methods are not particularly well suited for parallax visualization of imagery generated from large three-dimensional digital data sets such as those found in geographical browsers. For example, it is difficult to predetermine and preset a point of convergence when capturing geographical data for suitable parallax visualization.

The presently disclosed embodiments are directed to overcoming one or more of the problems associated with prior methods of parallax visualization of geographical data. For example, the presently disclosed embodiments may include the capability to capture geographical imagery in an orthographic (parallel viewing) manner. In addition, metadata describing the parameters of the captured imagery may also be stored. This allows the stored geographical data to be critically aligned (converged) to multiple points based on the particular requirements of the view and/or the display device.

SUMMARY OF THE DISCLOSED EMBODIMENTS

One aspect of the invention includes a method of using a computer to generate virtual autostereoscopic images from a three-dimensional digital data set. The method includes establishing a first point of view and field of view of a subject volume including a region of interest. The method includes reading at least one scene parameter associated with the field of view of the subject volume. The method includes determining a second point of view offset some distance and along some vector from the first point of view based on a value derived from at least one scene parameter wherein said second point of view at least partially overlaps the first field of view and wherein said first and second points of view create a view plane with perpendicular orthogonal views of the subject volume. The method also includes generating and storing images and relevant metadata from said first and second points of view. The method includes displaying the stored images by alternatingly displaying stored images from said first and second points of view at a rate of between 2 and 60 cycles per second. Additionally, one or more transformations can be performed on the alternatingly displayed images that brings some desired point in the region of interest of both images into a converged critical alignment wherein the said region of interest appears three-dimensional to a viewer on an standard two-dimensional unaided display.

BRIEF DESCRIPTION OF THE DRAWINGS

The accompanying drawings, which are incorporated in and constitute a part of this specification, represent exemplary features of the disclosed embodiments and, together with the written description, serve to explain the principles of operation of the disclosed embodiments. In the drawings.

DETAILED DESCRIPTION

The present disclosure relates to the parallax visualization of geographical data. In this context "geographical data" refers to three-dimensional digital data sets rendered as terrain models (subject volume) available through geographical browsers such as Google Earth and Virtual Earth. For purposes of this disclosure, the term metadata refers to and includes parameters that detail the conditions and settings, and other relevant data, at the time of image capture. Such metadata can be stored along with the image data. For purposes of this disclosure, parallax visualization describes, for example, the capture or generation and presentation over time of parallax data in a manner that will appear three-dimensional when viewed on a conventional, unaided display. Parallax visualization refers to a form of autostereoscopic display that exploits certain short-term visual memory and depth mapping psychophysical visual mechanisms associated with human depth perception.

The advent of freely-available interactive geographical data browsers like Google Earth that contain and present three-dimensional terrain information makes the additional step of parallax visualization infinitely practical. Such browsers are especially attractive for parallax visualization purposes because they have an intuitive user interface and are easily customized. In addition, the use of XML-based Keyhole Markup Language (KML) by such browsers for control makes customization very straightforward through the use of the Network Link tag structure. This allows for the highly accurate remote navigation and virtual camera control that is required for the subtle adjustments used to produce realistic depth enhancement through manipulation of parallax over time.

Figure 1:
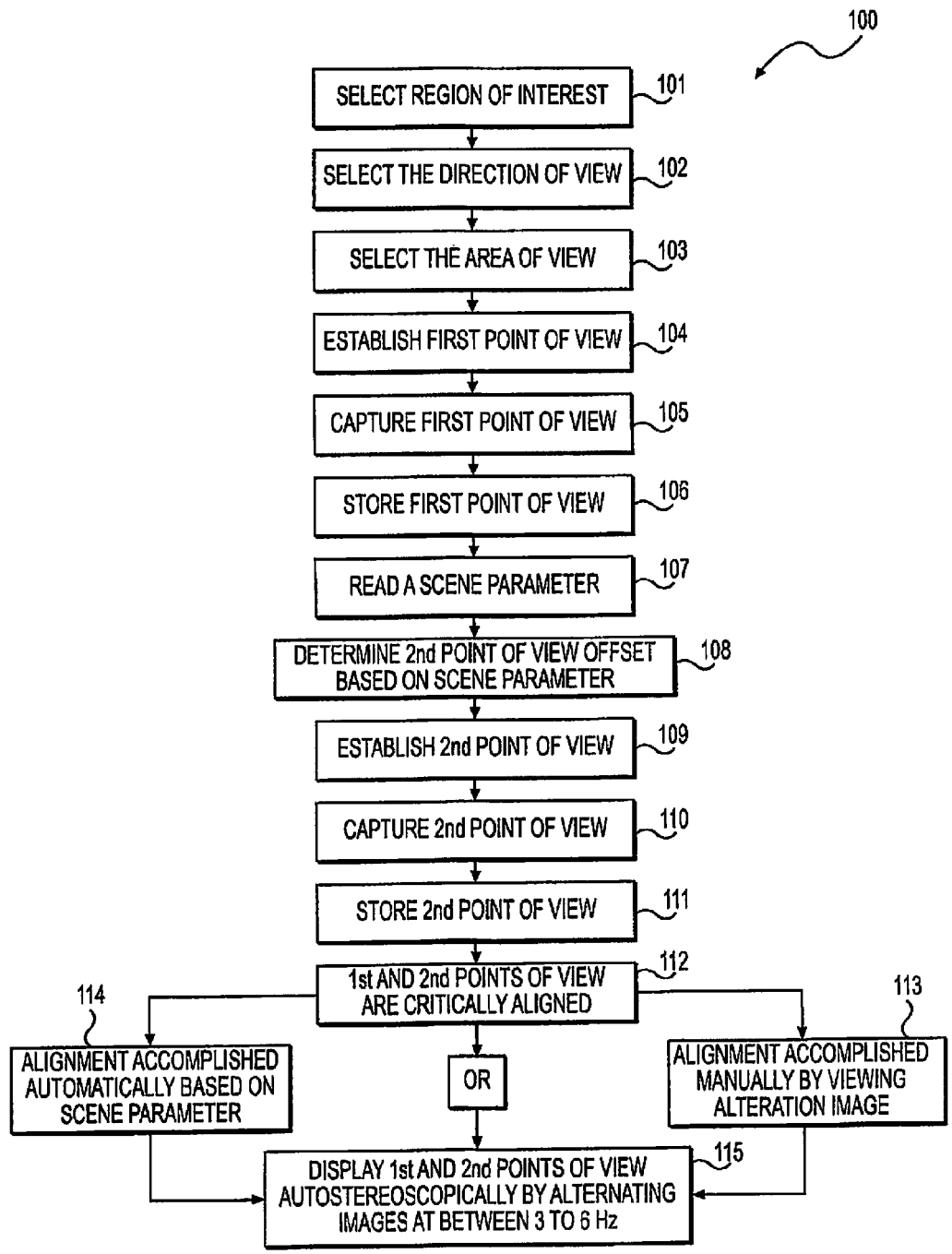
FIG. 1 is a flow chart representation of a two-point-of-view display method according to an exemplary disclosed embodiment.

FIG. 1 provides a flow chart representation of a two-point-of-view display method according to an exemplary disclosed embodiment. Flow chart 100 outlines first steps in a square-wave application of the presently disclosed embodiment. Step 101 includes the selection of a region of interest within the subject volume. Step 102 includes the selection of the direction of view, and step 103 includes the selection of the field of view. The field of view is typically preset in the browser at 60 degrees. The overall view (the area covered in the subject volume) is set based on the screen resolution and distance from the region of interest.

Step 104 includes establishing the first point of view. After a first point of view is determined, which establishes a camera position and view plane, a frame is captured (step 105) and stored (step 106). Along with the frame capture, scene parameters can be read (step 107) and stored as relevant metadata from that position.

Next, a second parallel offset point of view is determined and established (step 108). The second view is established (step 109) in a position adjacent to the first point of view perpendicular to the view plane of the first point of view. The distance of the offset relative to the first point of view is determined based on a scene parameter such as, for example, distance to the region of interest. Once the second point of view is established, a frame is captured (step 110) and stored (step 111) with relevant metadata from that position.

Next, the stored frames from the first and second points of view are brought into critical alignment (step 112) whereby a portion of the region of interest, which may be all or part of the region, is positioned so that it occupies the same location in the overlap areas of both the first and second points of view. The position of the point of critical alignment can be set visually (e.g., manually) (step 113) by alternating the first and second points of view at between 2 to 60 Hz and adjusting the relationship until a critical alignment is achieved. Critical alignment can also be achieved automatically (step 114) using predetermined or selected mathematical relationships. In the automatic technique of step 114, critical alignment may be set based on parameters such as, e.g., the distance to the region of interest from the first point of view. Once critical alignment has been achieved, the first and second points of view can be displayed autostereoscopically by alternating images at between 3 Hz and 6 Hz (step 115).

Figure 2:
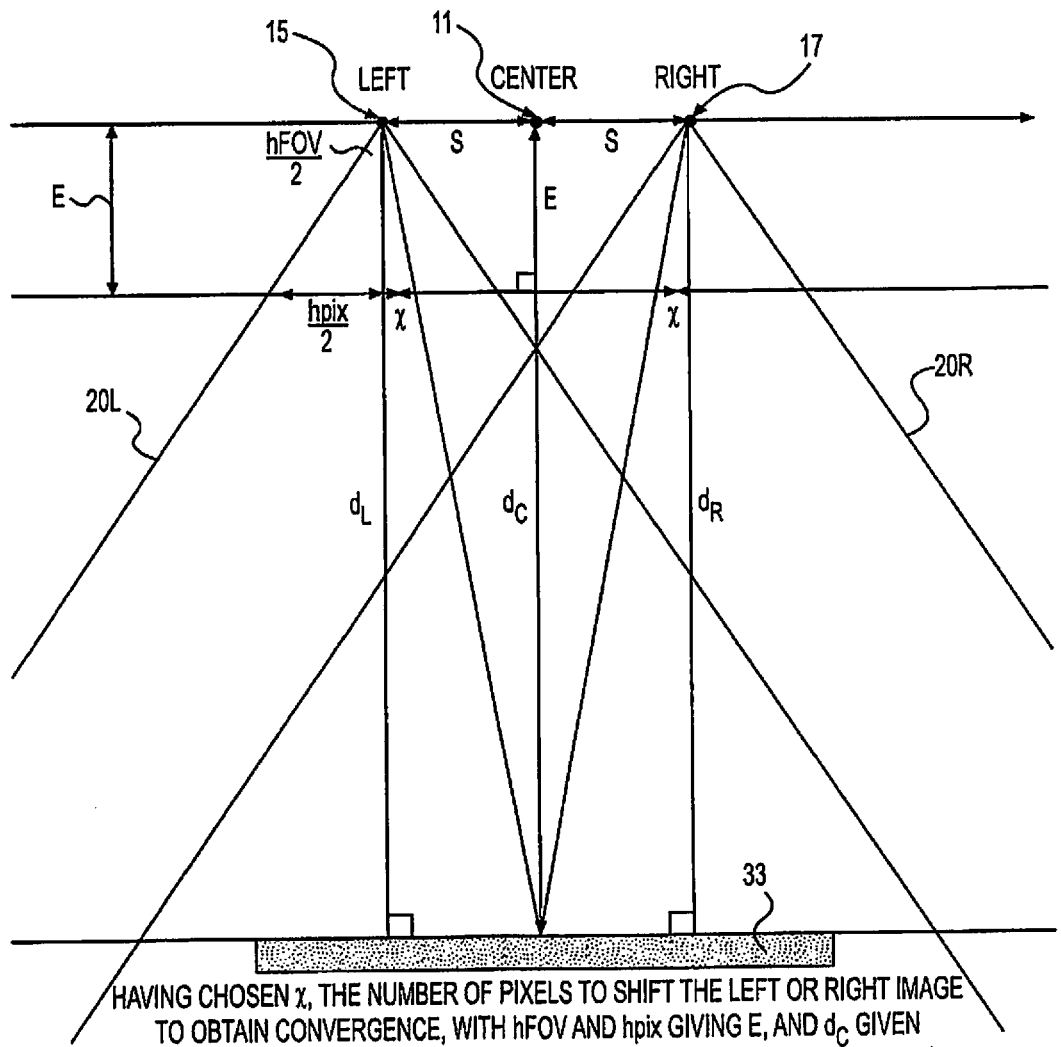
FIG. 2 is a mathematical representation of another two-point-of-view display method according to an exemplary disclosed embodiment.

FIG. 2 provides a diagrammatic representation of a square-wave display method according to the presently disclosed embodiments. The method represented by FIG. 2 is generally similar to the method outlined by the flow chart of FIG. 1. In the method of FIG. 2, however, a center point 11 is selected as a reference for establishing the view of an area of interest 33 and for determining the first point of view (POV) 15 and the second POV 17. Offset distance S can be determined by a scene parameter (e.g., a distance $d_c$) such that a field of view 20L associated with first POV 15 and a field of view 20R associated with second POV 17 field of view 20R overlap area of interest 33 in a desired amount. Once POV 15 and POV 17 are established, images may be captured and stored with relevant metadata from the respective positions. The diagram of FIG. 2 outlines the information necessary and, therefore, the procedure for auto-converging a pair of images rendered from offset positions with respect to center point 11 and corresponding to first POV 15 and second POV 17, respectively.

Offset distance S is a significant parameter to the methods of the presently disclosed embodiments. In determining offset distance S, it is helpful to develop a process that works well with an individual user's display screen and geographical browser. Certain exercises are helpful in putting the various parameters in context. For example, if we use the human visual model as a basis for determining an angle of view it would be two eyes with a separation of 65 mm viewing an object at one meter distance creating an angle of view for each eye of approximately 1.86 degrees. This can be mathematically described as follows:

separation=65 mm*1 m/1000 mm=0.065 m half (for each eye) separation=0.065 m/2=0.0325 m half angle (angle of convergence)=arctan(0.0325 m/1 m)=1.8614576 degrees If the human model is applied to geographical data (e.g., viewing an area of interest from a distance of, for example, one thousand meters), the method represented in FIG. 2 it would yield exemplary parameters, as follows:

half angle=1.8614576 degrees=arctan((half separation)/1000 m)

half separation=1000 m*tan(1.8614576 degrees)=32.5 meters separation=half separation*2=65 meters The previous exercise is not directly applicable when it comes to presenting parallax information over time. Alternating images between 3 to 6 Hz with parallax differences of 1.86 degrees produces images that can be unstable and difficult to view. However, the exercise is not futile when it comes to understanding the human visual mechanics. The perception of parallax information presented over time can be accomplished using small angles. For this reason it may be useful to test the particular geographical browser to determine what works well with the parallax visualization method being applied at a particular screen resolution. As a rule of thumb a scaling factor can be applied to the human model of 1.86 degrees (i.e., the half angle) on the order of 2 to 15 times smaller.

With respect to FIG. 2, applying a 1000 meter distance, $d_c$, from center point 11 to area of interest 33 and applying a scaling factor of 13 to the human model angle of 1.86 degrees with a field of view of 60 degrees for display on a screen with a horizontal resolution of 1280 pixels results in the following:

half angle=1.86/13=0.1431 degrees half separation=$S$=1000 m*tan(0.1431)=2.497 meters pixel shift for convergence=$X$=$E$*$S$/$d_c$=$E$*tan(half angle)

where the distance from the camera to the view plane in pixels,
E=half horizontal resolution/tan(half horizontal field of view)
horizontal resolution=hpix=1280 pixels
horizontal field of view=hFOV=60 degrees Under these conditions, E=640 pixels/tan(30 degrees)=369.5 pixels, and X=369.5*2.497/1000=369.5*0.002497=0.923 pixels.

FIG. 2 also leads to the procedure for auto-converging a pair of stored images, corresponding to the first POV 15 and the second POV 17, respectively, rendered by a geographical browser such as Google Earth. After choosing X (i.e., the number of pixels to shift POV 15 or POV 17 images to converge), with hFOV and hpix giving E, and $d_c$ given by the browser as (camera altitude—terrain altitude, in meters), we have: $d_L$=$d_R$=$d_C$.

In an exemplary application, the method represented by FIG. 2, as applied to a geographical browser like Google Earth, would progress as follows:

Supply center point 11 to Google Earth;

Google Earth responds with scene parameters including horizontal field of view angle, hFOV, horizontal pixel extent of view, hpix, and distance to terrain centered in the given view, $d_T$.

from these scene parameters, a distance E to the view plane is calculated as E=hpix/2/tan(hFOV/2) in pixels choose a distance to convergence, $d_C$, usually <=$d_T$, and a pixel offset, x, to calculate the offset distance, S=x*$d_C$/E in meters supply a first offset point of view, POV 15, to Google Earth by shifting the center point 11 by S meters to the left, perpendicular to the original view capture and store an image of this first point of view along with relevant metadata supply a second offset point of view, POV 17, to Google Earth by shifting the center point 11 by S meters to the right, perpendicular to the original view capture and store an image of this second point of view along with relevant metadata critically align the stored images by shifting the right image 2*x to the left, or by shifting the left image 2*x to the right, or by shifting each image by x in the respective opposite direction.

Critical alignment by more than x is equivalent to having chosen a smaller distance to convergence. Critical alignment by less than x is equivalent to having chosen a larger distance to convergence, assuming the same value of the offset distance, S.

Figures 3, 4:
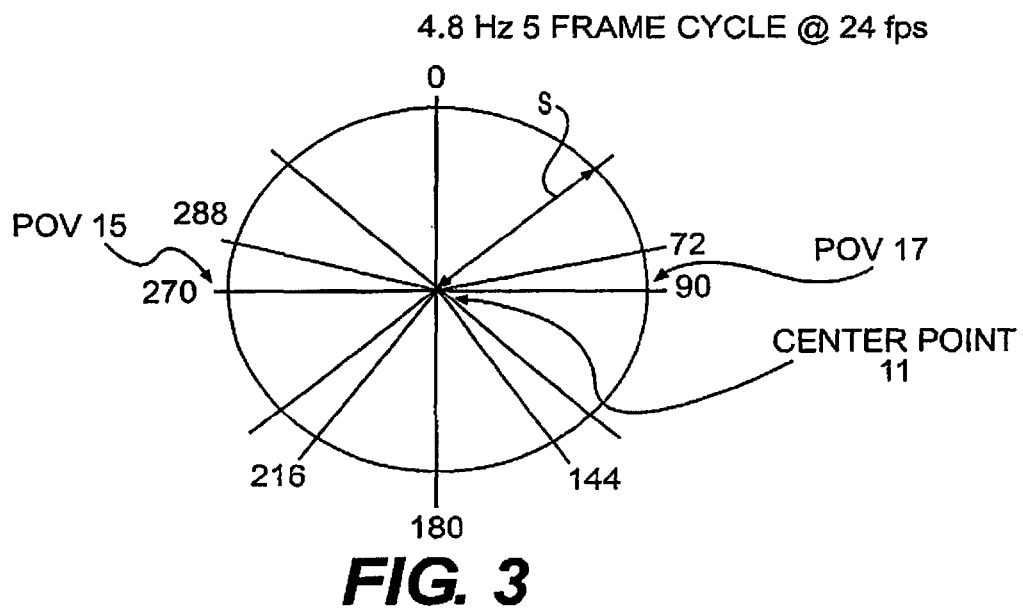
FIG. 3 is a diagrammatic representation of a multiple view arrangement according to an exemplary disclosed embodiment.
FIG. 4 is a table listing the parallax scan polar angles for each frame for both 24 and 30 frames per second playback.

A further method according to the presently disclosed embodiments is represented by FIG. 3. While the method of FIG. 2 includes the capture of views for square-wave display, the method of FIG. 3 includes the arrangement of multiple points of view (e.g., more than two points of view) offset from center point 11 and captured for display as parallax scanned images.

In the method of FIG. 3, center point 11 is selected as a reference for establishing the view of area of interest 33 and also for determining the polar coordinates for the placement of the parallax scan points of view. Each point of view is determined, for example, by the separation (radius), the scan frequency, the current frame count, and the frame rate. The geometry of the scan path is typically elliptical or circular but can also include other geometries depending on the requirements of a particular application. The scan path may be random, algorithmic, or even determined by some external function like a sound source. Assuming the parallax scan path is a perfect circle, each successive point of view will have a constant angular separation defined as:

360 degrees/cycle*scan frequency (cycles/second)/frame rate (frames/second)

For example, a scan frequency of 4.4 Hz and a frame rate of 30 frames per second gives an angular separation of 360*4.4/30=52.8 degrees.

The progression of the polar coordinates of parallax scan points of view may be accomplished by assigning the first parallax scan position to the chosen initial angle and radius. Subsequent positions may be determined by adding a constant separation angle to the current position while maintaining a constant radius (or half separation). The polar coordinates for a particular frame in a sequence may be defined, for example, as:

(frame number*separation angle+initial angle,radius)

Each frame represents the angular component of the polar coordinates for a parallax scan position. Here, the frame number counts from 0, the initial angle is determined by the situation or the requirements of the user, the separation angle is as defined as above, and the radius is the same as the half separation defined earlier. These polar coordinates may also be expressed as a Cartesian coordinate vector. For example, given a set of polar coordinates (angle, radius), and, assuming clockwise rotation with an angle of 0 aligned with the y-axis, one can calculate Cartesian coordinates (x,y) as (radius*sin(angle), radius*cos(angle)). A table illustrating the parallax scan polar angles for each frame for both 24 and 30 frames per second playback is provided in FIG. 4.

In the method represented by FIG. 3, the offset distance S for each parallax scan position can be determined by a scene parameter, such as a distance $d_c$, in a manner similar to the square-wave methods discussed above. Each parallax scan position may be offset by value S from center point 11 and located in its proper position along the parallax scan path. As shown in FIG. 3, POV 15 is located at a distance S from center point 11 and at a parallax scanning position of 270 degrees. Similarly, POV 17 is located at a distance S from center point 11 and at a parallax scanning position of 90 degrees. Multiple parallax scanning positions may be selected and used from along the 360 degree parallax scanning path. FIG. 4 provides an exemplary table of such multiple parallax scanning positions corresponding to frame rates of both 24 frames per second and 30 frames per second.

Figure 5:
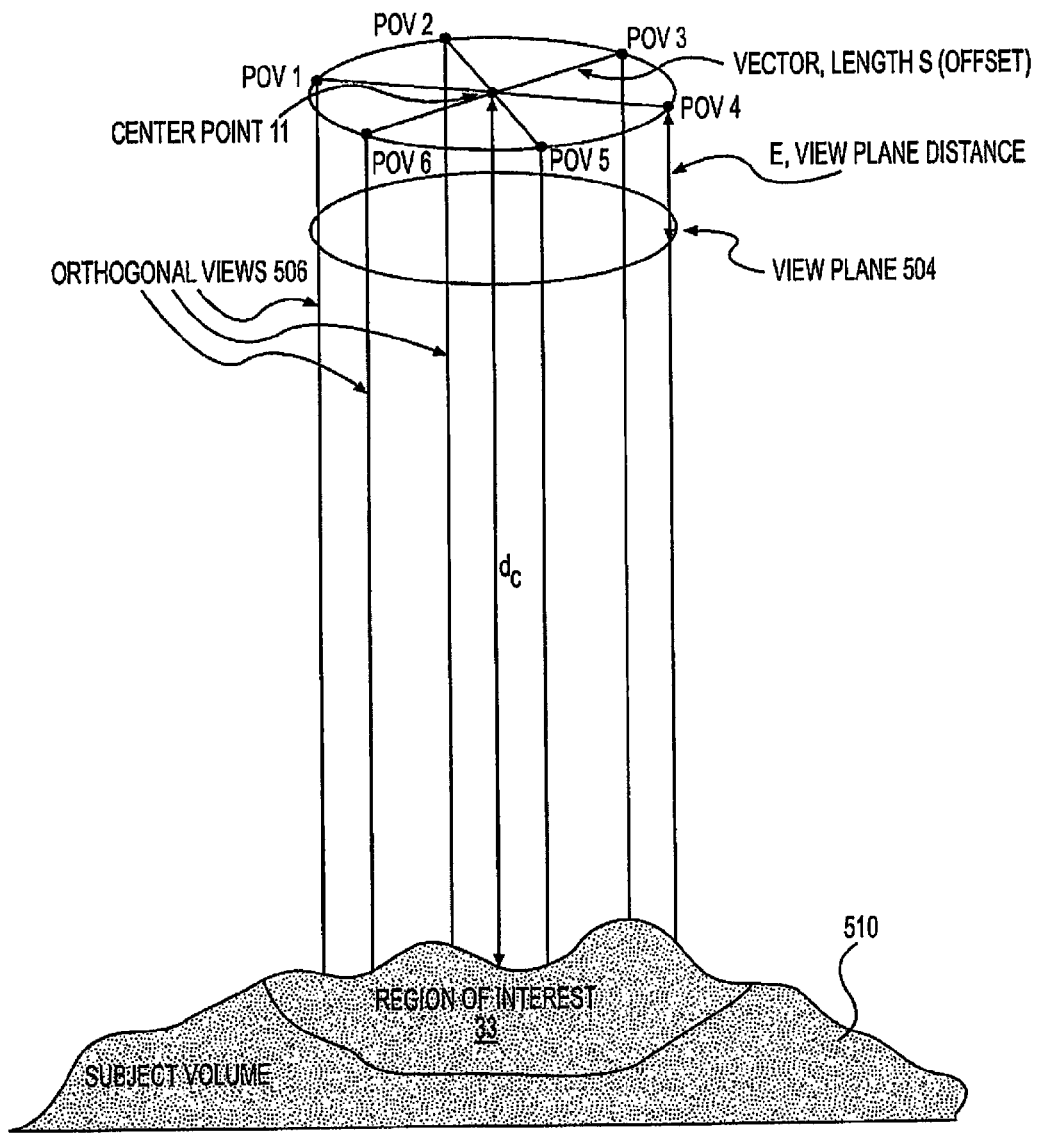
FIG. 5 is a diagrammatic representation of parallax scanning points of view at 4 Hz and 24 frames per second.

Applying the method of FIG. 3, FIG. 5 illustrates the polar positions of a 4 Hz parallax scan at 24 frames per second. Shown in FIG. 5 is the center point 11 along with six points of view (POV 1 . . . POV 6). Each point of view is offset from the center point 11 by an offset distance S. FIG. 5 also illustrates a view plane 504 and multiple orthogonal view 506. The area being imaged includes a region of interest 33 selected from the subject volume 510. The center point 11 is located at an orthogonal distance $d_C$ from the region of interest 33.

The presently disclosed embodiments include techniques for locating and capturing orthographic (parallel) views for square-wave and parallax scanning autostereoscopic display of geographical data from a fixed position. The presently disclosed embodiments methods can also be applied to capturing data from positions along a motion path for presentation as moving images (movie).

Building such a movie can be accomplished through a number of steps, including:
  defining a path through a chosen scene
  instructing the geographical browser to step along the path
  calculating parallax view positions
  capturing and storing frames
  critically aligning frames
  assembling frames as an animation These steps are further described below using Google Earth as an exemplary platform.

The step of defining a path through a chosen scene first includes using Google Earth's Path tool to specify a sequence of points following a section of landscape. The KML data describing the path can then be exported to a text file containing a comma-delimited list of points (longitude, latitude, elevation, and heading). It may also be suitable to acquire a sequence of points algorithmically or from some other geographic data source.

To aid in path definition, software can be provided to perform interpolation of the points along the path to provide smooth transit. A simple linear interpolation can be used initially to simplify the calculations for constant distance steps along the selected path and to smooth the changes in heading. In addition, the calculations can be expanded to use a cubic spline and the Composite Simpson's Rule to solve for path length. The tangent at each constant-distance step can be used for the heading. The smoothing process requires a conversion from the coordinates of Google Earth (spherical or ellipsoidal) to Cartesian coordinates and back. Google Earth uses what is called the Simple Cylindrical projection of the WGS84 datum. Usually, the Simple Cylindrical projection is only used with a sphere so a direct conversion can be provided. A customized interface can be used with the Universal Transverse Mercator projection of the standard ellipsoid to calculate very accurate approximations over the short distances being used.

The smoothed data points can be fed back into Google Earth to acquire terrain elevations at each point. Google Earth's terrain model can be used to obtain elevations and to set limits on the elevations that are presented back to the program for the final visualization step. Such elevation limits can aid in minimizing or eliminating interface-generated errors that may result from elevations located below the surface of a terrain model for the associated position. Appropriate elevations facilitate production of a smooth, "crash-free" flight path. The elevation profile could also be acquired from an external terrain model, as an extension.

In response to instructions for Google Earth to step along the defined path, the Google Earth network interface will pass back a complete set of scene parameters, including elevation for each position it receives, allowing the user to accumulate a profile for the chosen path. At this point the opportunity exists to smooth and meld the path by modifying the tilt (pitch: nose up and down) and the roll (rotation along the axis of motion to make turns more realistic), and to smooth the elevations.

Once a smooth path is obtained, the flight plan can be visualized. Google Earth's network interface provides the user a complete programmatic control over the virtual camera. Each call from the network interface can be answered with the data corresponding to the next frame to be captured, and each step can be provided with an appropriate offset to produce parallax in the rendered scene.

Next, the parallax view positions can be calculated. The primary effect from parallax depth-enhancement comes from the choice of the offset or view separation. A smaller view separation corresponds to a convergence point (apparent scene depth where there is no visible pixel motion from one frame to the next) that is closer to the camera, while a larger view separation corresponds to a convergence point that is farther from the camera. This is the inverse of the pixel separation, which is the number of pixels to shift each image to critically align them at the chosen convergence point. A smaller pixel separation corresponds to a convergence point that is farther from the camera, while a larger pixel separation corresponds to a convergence point that is closer to the camera.

There are several strategies that can be used for deciding where one wants the convergence to be in a series of images. One can use a fixed depth so that the convergence never changes from frame to frame. One can use an adaptive method, which tracks the objects in a region of visual interest, and can choose to converge on or near those objects. Or, one can choose to converge optimally for an entire scene by finding the range of depths of objects and empirically finding the "sweet spot" that brings the scene to life.

In general, though, the process relies most heavily on the calculation of the offset of the camera from its previously determined path to produce the desired parallax. Google Earth provides the virtual camera which is defined by its position (longitude, latitude, altitude), orientation (heading, tilt, roll), and its view parameters (horizontal and vertical pixel resolution, horizontal and vertical field of view, and view plane distance (also known as eye distance, or, indirectly, focal length)). Google Earth also provides the fields of view and the resolution of the display window from which the distance to the view plane in pixels may be calculated. For example:

$$E = (\text{horizontal resolution})/(2*\tan(\text{horizontal field of view}/2))$$

At this point, the user can either choose the pixel separation or the view separation (in meters) for a given distance (in meters) from the eye (or camera) for convergence. A constant distance may be used, the distance from the camera to the terrain for each point (variable), or even a smoothed version of the latter.

Given the pixel separation, the view separation can be represented as:

$$S = ((\text{pixel separation})*(\text{distance to convergence}))/(\text{view plane distance})$$

Or, given the view separation, the pixel separation can be represented as:

$$X = \frac{(\text{view separation})*(\text{view plane distance})}{(\text{distance to convergence})}$$

Again, the view separation is the distance from the camera position on the path to the offset camera position, while the pixel separation is the distance in the view plane that each image must be moved to align the converged distance. With these values known, the new camera position can be calculated from the original camera position along the path. This is very simple for the stereo square-wave case where the camera is offset perpendicular to the heading (east or west, left or right) to get positions of parallax. For the parallax scanning case, the inverse view transformation may be calculated for the desired angular displacement on the circle in the plane of the camera. This may be accomplished using a set of matrix multiplications that mimic steps from the rendering pipeline of OpenGL and many other 3D computer graphics rendering environments, where the order of matrix operations can proceed as follows:

[the position in space of the offset camera]=[the position in space of the original camera]*[the rotation about the y-axis for the heading]*[the rotation about the x-axis for the tilt]*[the rotation about the z-axis for the roll]*[the rotation about the z-axis for the camera's angular displacement in the scan circle]*[the translation along the y-axis for the view separation]

Next, the frames can be captured and stored based on the defined camera positions from which Google Earth will render. This information is sent along with the associated orientation parameters to Google Earth in response to a network interface call. It is assumed that Google Earth would render the next frame from this point of view. The program's next call contains the location and orientation of its most-recently rendered frame, which closely matches the parameters that were sent. This triggers a call to an operating system-dependent screen capture utility that saves the current frame in a sequentially numbered file. The process continues for each smoothed point. Upon completion of this process, a set of frames will be available that can be accumulated into an animated movie for presentation and analysis.

The captured set of frames can then be critically aligned. In generating the position and orientation data for each view (frame), critical alignment parameters are also generated. After each frame is captured it is aligned to match the selected and calculated values to achieve the desired parallax scan. This is accomplished by shifting an image by the horizontal and vertical pixel amount calculated by the process. The following exemplary parameters illustrate this process in action:

convergence distance: 1000 m (given)
separation: 2.5 m (given)
angle of parallax: arctan(2.5/1000)=0.1432 degrees
scan frequency: 4.4 Hz (given)
frame rate: 30 frames per second (given)
separation angle: 360*4.4/30=52.8 degrees
initial angle: 0 degrees (given)
frame number: 42 (counting from 0) (chosen for example)
polar coordinates of scan position:

$$= (\text{frame number} * \text{separation angle} + \text{initial angle, radius})$$

$$= (42 * 52.8 + 0, 2.5) = (2217.6, 2.5) = (57.6, 2, 5)$$

Cartesian coordinates (S vector):
=(2.5*sin(57.6), 2.5*cos(57.6))=(2.111, 1.340)
horizontal field of view: 60 degrees (supplied by Google Earth)
horizontal pixel resolution: 1280 pixels (supplied by Google Earth)
E (view plane distance)=hpix/2/tan(hFOV/2)=1108.5125168440818
x=E*SMC=E*2.5*sin(57.6)/1000=2.340 pixels to shift horizontally
y=E*SY/dC=E*2.5*cos(57.6)/1000=1.485 pixels to shift vertically The direction of the shift for any given frame is usually the negative or opposite of the sign indicated by the calculations. Typically, the coordinate system in the view plane has the positive direction as right or up for x and y respectively while the coordinate system in the image space has the positive direction as right and down for x and y respectively. Also, a positive offset in the view plane corresponds to a negative shift (in view plane coordinates) to achieve alignment. So, in the above calculations, both components of the final separation vector are positive which means that the horizontal pixel shift should be negative (to accommodate the alignment direction) while the vertical pixel shift should be positive (to accommodate the alignment direction and the image coordinate system direction).

Next, the aligned frames can be assembled together into an animated movie. This movie will constitute a depth-enhanced version of a fly-through of the selected region of interest.

It should be noted that the methods of the presently disclosed embodiments, as described above, may be accomplished using any suitable computing device. For example, any of today's modern computers can be configured with appropriate software for executing the computational and display techniques described above. These methods may also be accomplished as part of a pre-processing or predetermined processing routine the results of which may be configured for later display on a user screen. Alternatively, or additionally, the described methods of generating and critically aligning images according to any of the methods described above may be accomplished in real-time or in near real-time by the viewer. In such real-time or near real-time processes, computers may be employed that calculate and display the above-described critically aligned images, e.g., as input is received (or within milliseconds of receiving input) from a user or as input, in the form of computational output generated by a processor, becomes available for continued processing.

Additional advantages and modifications will readily occur to those skilled in the art. The invention in its broader aspects is, therefore, not limited to the specific details, representative algorithms and illustrative examples shown and described. Accordingly, departures may be made from such details without departing from the spirit or scope of applicants' inventive concept.

What is claimed is:

1. A method of using a computer to generate virtual autostereoscopic images from a three-dimensional digital data set, comprising:
    establishing a first point of view comprising a first field of view of a subject volume including a region of interest;
    reading a scene parameter associated with the first field of view of the subject volume;
    determining a second point of view offset some distance and along some vector from the first point of view based on a value derived from the scene parameter wherein said second point of view comprises a second field of view that at least partially overlaps the first field of view and wherein said first and second points of view create a view plane perpendicular to orthogonal views of the subject volume;
    generating and storing images and relevant metadata from said first and second points of view;
    determining a critical alignment transformation for at least one stored image based on the offset distance and an angle of convergence of at least one of the first point of view and the second point of view;
    performing a transformation using the critical alignment transformation on the at least one stored image that brings some desired point in the region of interest of the at least one stored image into a converged critical alignment wherein the region of interest appears three-dimensional to a viewer on a standard two-dimensional unaided display; and
    displaying the stored images by alternatingly displaying the transformed images from said first and second points of view at a rate of between 2 and 60 cycles per second.

2. The method of claim 1, wherein said first point of view is established based on a central point of view of the region of interest in the subject volume, and
    wherein an additional point of view is offset, with respect to at least one of the center point of view or the first point of view, by some distance and along some vector in the view plane with orthogonal overlapping fields of view of the region of interest,
    wherein the determination and offset of the additional point of view is based on the scene parameter associated with the subject volume.

3. The method of claim 2, wherein said additional point of view is arranged at polar coordinates in the view plane that includes the center point of view, the first point of view, and the second point of view.

4. The method of claim 2, further comprising:
    progressing the first point of view step-by-step along a simulated flight path; and
    determining the additional point of view in the view plane on a frame-by-frame basis at a progressing polar coordinate offset some distance along a vector at each step of the flight path where an additional image is generated and stored.

5. The method of claim 1, wherein the scene parameter being read is a distance from a center point of view to a point in the region of interest.

6. The method of claim 4, further comprising adjusting the additional point of view, offset distances, and vectors on a frame-by-frame basis based on changes in one or more scene parameters.

7. The method of claim 1, wherein displaying the stored images by alternatingly displaying the transformed images from said first and second points of view at a rate of between 2 and 60 cycles per second comprises displaying the stored images in a square-wave switching manner at a rate of between 3 and 6 cycles per second.

8. The method of claim 3, further comprising:
    generating and storing images from the additional point of view; and
    displaying the images generated and stored from the additional point of view in a parallax-scanning manner.

9. The method of claim 1, wherein the transformation comprises an orthogonal image transformation that is based on at least one of scene or view screen resolution parameters.

10. The method of claim 1, wherein the images from the first and second points of view are generated and critically aligned in in near real-time.

11. The method of claim 4, further comprising assembling the images generated and stored through progression of the simulated flight path for display as a parallax scanning movie.

12. The method of claim 1, further comprising assembling the images generated from the first and second points of view for display as a square-wave switching movie.

13. The method of claim 1, further comprising:
    progressing the first point of view step-by-step along a simulated flight path;
    determining the additional point of view in the view plane on a frame-by-frame basis at a square-wave switching offset some distance along a vector at each step of the flight path; and
    generating and storing an image at each step of the flight path.

14. The method of claim 13, further comprising assembling the images generated and stored through progression of the simulated flight path for display as a movie.

15. A computer system, comprising:
    a display;
    a memory; and a processor coupled to the display and memory, and configured with processor-executable instructions to perform operations comprising:

establishing a first point of view comprising a first field of view of a subject volume including a region of interest;

reading a scene parameter associated with the first field of view of the subject volume;

determining a second point of view offset some distance and along some vector from the first point of view based on a value derived from the scene parameter wherein said second point of view comprises a second field of view that at least partially overlaps the first field of view and wherein said first and second points of view create a view plane perpendicular to orthogonal views of the subject volume;

generating and storing images and relevant metadata from said first and second points of view;

determining a critical alignment transformation for at least one of the stored images based on the offset distance and an angle of convergence of at least one of the first point of view and the second point of view;

performing a transformation using the critical alignment transformation on the at least one stored image that brings some desired point in the region of interest of the at least one stored image into a converged critical alignment wherein the region of interest appears three-dimensional to a viewer on a standard two-dimensional unaided display; and displaying the stored images by alternatingly displaying the transformed images from said first and second points of view at a rate of between 2 and 60 cycles per second.

16. The computer system of claim 15, wherein said first point of view is established based on a central point of view of the region of interest in the subject volume, and wherein an additional point of view is offset, with respect to at least one of the center point of view or the first point of view, by some distance and along some vector in the view plane with orthogonal overlapping fields of view of the region of interest, wherein the determination and offset of the additional point of view is based on the scene parameter associated with the subject volume.

17. The computer system of claim 16, wherein the additional point of view is arranged at polar coordinates in the view plane that includes the center point of view, the first point of view, and the second point of view.

18. The computer system of claim 16, further comprising:

progressing the first point of view step-by-step along a simulated flight path; and determining the additional point of view in the view plane on a frame-by-frame basis at a progressing polar coordinate offset some distance along a vector at each step of the flight path where an additional image is generated and stored.

19. The computer system of claim 15, wherein the scene parameter being read is a distance from a center point of view to a point in the region of interest.

* * * * *